United States Patent [19]

Amdall et al.

[11] Patent Number: 4,531,746
[45] Date of Patent: Jul. 30, 1985

[54] DUAL LABYRINTH FLUID SEAL WITH FLUID SLINGER

[75] Inventors: John K. Amdall; Benny Ballheimer, both of Peoria, Ill.

[73] Assignee: Caterpillar Tractor Co., Peoria, Ill.

[21] Appl. No.: 648,555

[22] PCT Filed: Dec. 10, 1982

[86] PCT No.: PCT/US82/01729
§ 371 Date: Dec. 10, 1982
§ 102(e) Date: Dec. 10, 1982

[87] PCT Pub. No.: WO84/02382
PCT Pub. Date: Jun. 21, 1984

[51] Int. Cl.$^3$ .......................... F16J 15/42; F16J 15/44
[52] U.S. Cl. .......................... 277/53; 277/59; 277/68; 277/74; 277/203
[58] Field of Search .......................... 277/53–55, 277/58, 59, 67–69, 74, 203

[56] References Cited

U.S. PATENT DOCUMENTS

| 978,399 | 12/1910 | Rotter | 277/53 X |
|---|---|---|---|
| 1,505,647 | 8/1924 | Junggren | 277/68 X |
| 1,558,630 | 10/1925 | Reed | 277/53 X |
| 1,720,696 | 7/1929 | Simpson | 277/53 X |
| 2,526,594 | 10/1947 | Voysey | 308/36.3 |
| 2,631,071 | 5/1948 | Alden | 308/187.1 |
| 3,468,548 | 9/1969 | Webb | 277/67 |
| 3,545,570 | 12/1970 | Schrader | 184/6 |
| 3,724,861 | 4/1973 | Lesiecki | 277/25 |
| 4,273,343 | 6/1981 | Visser | 277/53 |
| 4,314,705 | 2/1982 | Shimizu | 277/67 |
| 4,368,895 | 1/1983 | Okamoto et al. | 277/203 |

FOREIGN PATENT DOCUMENTS

| 917696 | 12/1972 | Canada | 277/55 |
|---|---|---|---|
| 2164135 | 7/1973 | Fed. Rep. of Germany | 277/203 |
| 832676 | 4/1960 | United Kingdom | 277/53 |

Primary Examiner—Robert S. Ward
Attorney, Agent, or Firm—Larry G. Cain

[57] ABSTRACT

A fluid seal device (10) has a plurality of non-contacting fluid seals located at the operative interface (16) between a stationary member (18) and a rotatable member (20) for preventing the leakage of a fluid from a fluid chamber (14). The first of the non-contacting seals (24) is a labyrinth seal (32) located adjacent the fluid chamber (14). The second non-contacting seal (40) is a spiral groove (42) located adjacent and in serial relation to the labyrinth seal (32). A third non-contacting seal (60) is a fluid slinger (62) which is located between the fluid chamber (14) and the labyrinth seal (32) for directing fluid (12) away from the path of operative interface (16). The fluid seal device (10) eliminates friction and increases the life expectancy thereof when used at the operative interface (16) between a stationary member (18) and a rotatable member (20) such as a crankshaft and block of an engine.

10 Claims, 2 Drawing Figures

U.S. Patent   Jul. 30, 1985   4,531,746
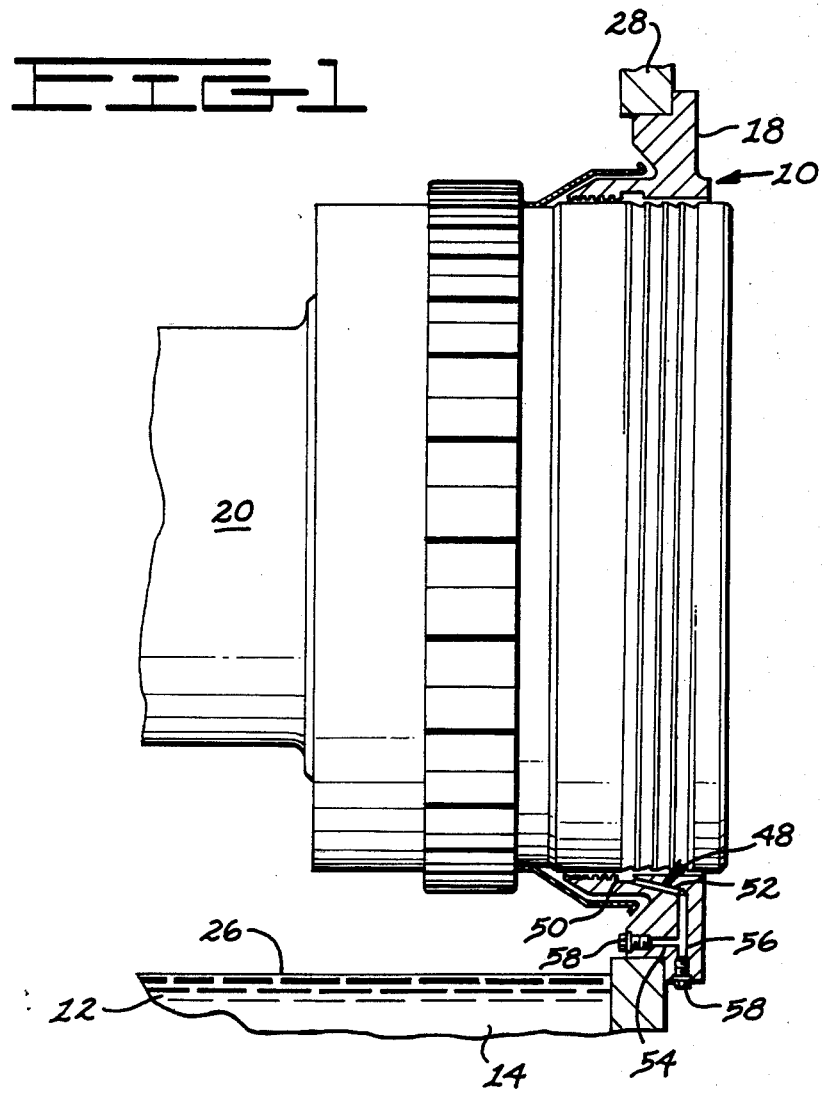
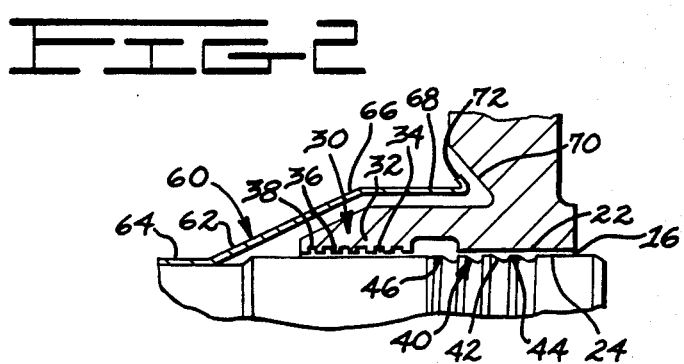

DUAL LABYRINTH FLUID SEAL WITH FLUID SLINGER

DESCRIPTION

1. Technical Field

This invention relates generally to a fluid seal device and more particularly to a plurality of non-contacting fluid seals located within the operative interface between a stationary member and a rotating member.

2. Background Art

The fluid within a fluid chamber such as, the pan of an engine or compressor is used for lubrication and cooling. The fluid is distributed by a pump through passages within the block to lubricate and cool the crankshaft, pistons, connecting rods, camshaft and other moving parts. Some systems also use a splash lubrication system. In either of these systems the fluid after it lubricating and cooling drains back into the pan. During the draining of the fluid, the crankshaft strikes the fluid. The striking of the fluid agitates, splashes and throws the fluid against the interior walls of the pan and block. The fluid tends to leak out of the fluid chamber should a leakage path exist. The primary path of leakage will be at the operative interface between the crankshaft and the block of the engine or compressor. This path of operative interface must be sealed to prevent the loss of fluid from the fluid chamber.

The sealing member of a conventional fluid seal device is normally a contacting seal. The seal is located in the operative interface between a stationary member and a rotating member. Such seals are maintained in frictional engagement with the rotating member. This results in wear to the seal thereby reducing its life expectancy.

Other conventional fluid seal devices employ a non-contacting seal in an attempt to increase the life expectancy of the sealing device. For example, labyrinth seals have been used within the interface between a stationary member and a rotating member for preventing leakage from a fluid reservoir. To be more effective, many labyrinth seals employ a fluid introduced at an intermediate location within the sealing member to help prevent leakage from the fluid chamber. The leakage from the fluid chamber still tends to exist.

Another non-contacting seal device well known in the art is the fluid slinger. Such slingers act as sealing devices by utilizing centrifugal force to prevent a fluid from leaking from a fluid chamber. Slingers have been used both between the fluid chamber and the leak path as well as between the atmosphere and the leak path. The purpose of the slinger in the latter example is to prevent dirt and other contaminates from entering the fluid chamber. Leakage from the fluid chamber past the slingers still exist.

Another type of non-contacting fluid sealing device is the spiral groove or oil return grooves used in conjunction with an oil seal contacting the rotating member and the stationary member chamber.

The conventional fluid seals as identified above all have short comings. The single non-contacting seal device does not positively prevent leakage of fluid therethrough while the combination of non-contacting and contacting seals does not provide the life expectancy of long-life seal devices.

The present invention is directed to overcoming one or more of the problems as set forth above.

DISCLOSURE OF THE INVENTION

In one aspect of the present invention, a sealing device for preventing leakage of a fluid from a fluid chamber through a path of operative interface disposed between a stationary member and a rotatable member located above the level of fluid in the fluid chamber comprises a first non-contacting seal and a second non-contacting seal disposed at the operative interface. The second non-contacting seal is adjacent and in serial relation to the first non-contacting seal. The first non-contacting seal is located between the fluid chamber and the second non-contacting seal.

In another aspect of the present invention a sealing device is disclosed containing a third non-contacting seal disposed at the operative interface and located between the fluid chamber and the first non-contacting seal.

BRIEF DESCRIPTION OF THE DRAWINGS

FIG. 1 is a partial sectional view of an embodiment of the present invention; and FIG. 2 is an enlarged sectional view of the operative interface showing an embodiment of the present invention.

BEST MODE FOR CARRYING OUT THE INVENTION

A seal 10 is shown in the drawing for preventing leakage of a fluid 12 from a fluid chamber 14 through the path of operative interface 16 between a stationary member 18 and a rotatable member 20. As used herein the term operative interface 16 is the spacing or operating clearance between a bore 22 of the stationary member 18 and a circumferential surface 24 on the rotatable member 20. The leak path between these members also defines the operative interface 16. A fluid level 26 in the fluid chamber 14 is located below the operative interface 16 to prevent the loss of fluid 12 by gravity flow. The stationary member 18 is attached in a known manner to a wall 28 of the fluid chamber 14 as illustrated in FIG. 1. Alternatively the stationary member 18 and wall 28 may be a single stationary member.

The stationary member 18 contains a first non-contacting seal means 30 which is a labyrinth seal 32 including a plurality of serially disposed annular grooves 34 in or attached to the bore 22 of the stationary member 18 forming an outer circumferential surface 38 of the operative interface 16. The labyrinth seal 32 is located adjacent the fluid chamber 14.

A second non-contacting seal means 40 is disposed at the operative interface 16 and located in or attached to the rotatable member 20. The second non-contacting seal means 40 is a spiral groove 42 which during the rotation of the rotatable member 22 directs leakage, which has leaked past the labyrinth seal 32, back toward the fluid chamber 14. The fluid 12 pumped from the spiral groove 42 acts as a dam and prevents fluid 12 from leaking through the operative interface 16. The spiral groove 42 is placed downstream of the labyrinth seal 32 in reference to the direction of fluid 12 leakage from the fluid chamber 14. The spiral groove 42 can be either a left-hand or right-hand lead depending on the direction of rotation of the rotatable member 20. A crest 44 of the spiral groove 42 forms a portion of an inner circumferential surface 46 of the operative interface 16.

As an option, a drain means 48 is located within the stationary member 18 and between the first and second non-contacting seal means 30,40. As shown in FIG. 1, the drain means 48 includes an annular groove 50 and first, second, and third fluid passages 52,54,56 in the stationary member 18. The annular groove 50 is connected to the fluid chamber 14 by the first and second fluid passages 52,54 and to the atmosphere by the third fluid passage 56. The end of the passages 54,56 are plugged to prevent the use of either drain path. The removal of the respective plug 58 will allow fluid 12 collected in the annular groove 50 to escape to either the fluid chamber 14 or atmosphere. If the optional drain is not used, these passages can be omitted.

A third non-contacting seal means 60 includes a fluid slinger 62 incorporated in combination with the labyrinth seal 32 and the spiral groove 42. The fluid slinger 62 is attached to the rotatable member 20 in sealed relation by conventional methods and located between the fluid chamber 14 and the labyrinth seal 32. As shown in FIG. 2, the fluid slinger 62 has extending from a collar 64 a cylindrical portion 66 which overlaps the first non-contacting seal means 30. A lip 68 of the fluid slinger 62 extends into a recess 70 formed in the stationary member 18. The lip 68 is constructed with a radially extending flange 72. The rotational action of the fluid slinger 62 creates a centrifugal force which will sling the fluid 12 from the fluid slinger 62 away from the operative interface 16.

INDUSTRIAL APPLICABILITY

The seal 10 prevents the leakage of a fluid 12 from a fluid chamber 14. For example, in operation, the fluid slinger 62 restricts the flow of leaking fluid 12 from reaching the path of operative interface 16 between the stationary member 18 and the rotatable member 20 by throwing the fluid 12 away from the operative interface 16. The lip 68 of the fluid slinger 62 prevents fluid 12 which drains from the walls 28 from entering the path of operative interface 16. The labyrinth seal 32 restricts the leakage of fluid 12 from the fluid chamber 14 by creating high and low pressure zones. As a further restriction to fluid 12 leakage through the path of operative interface 16, a spiral groove 42 is included. The pumping action of the spiral groove 42 creates a high pressure area at the exit of the groove which will restrict the leakage of fluid 12 from the fluid chamber 14. When used in an engine the seal 10 prevents the leakage of oil from the crankcase between the cylinder block end cover and the crankshaft.

We claim:

1. A seal (10) for preventing leakage of a fluid (12) from a fluid chamber (14), through a path of operative interface (16) disposed between a stationary member (18) and a rotatable member (20) and located above the level of fluid (26) in the fluid chamber (14) comprising:
   first non-contacting seal means (30) disposed at the operative interface (16) and located in the stationary member (18);
   second non-contacting seal means (40) disposed at the operative interface (16) and located in the rotatable member (20) adjacent and in serial relation to said first non-contacting seal means (30); and
   said first non-contacting seal means (30) being located between the fluid chamber (14) and the second non-contacting seal means (40).

2. A seal (10) as set forth in claim 1, wherein the first non-contacting seal means (30) is a labyrinth seal (32) including a plurality of serially disposed annular grooves (34).

3. A seal (10) as set forth in claim 1, wherein the second non-contacting seal means (40) is a spiral groove (42) adapted to direct leakage of fluid (12) toward the fluid chamber (14) during the rotation of the rotatable member (20).

4. A seal (10) as set forth in claim 3, further including drain means (48) for removing any build up of fluid within the path of operative interface (16), said drain means being located between the first and second non-contacting seal means (30,40).

5. A seal (10) as set forth in claim 4, wherein said drain means (48) is connected to the fluid chamber (14).

6. A seal (10) as set forth in claim 4, wherein said drain means (48) is open to atmosphere.

7. A seal (10) as set forth in claim 1, further including third non-contacting seal means (60) located between the fluid chamber (14) and said first non-contacting seal means (30).

8. A seal (10) as set forth in claim 7, wherein said third non-contacting seal means (60) is a fluid slinger (62) attached to the rotatable member (20).

9. A seal (10) as set forth in claim 8, wherein said fluid slinger (62) overlaps said first non-contacting seal means (30) and is adapted to sling fluid (12) away from the operative interface (16) between the stationary member (18) and the rotating member (20).

10. A seal (10) as set forth in claim 8, wherein said stationary member (18) contains a recess (70) and said fluid slinger (62) protrudes into the recess (70).

* * * * *